United States Patent [19]

Nakano et al.

[11] Patent Number: 4,780,826
[45] Date of Patent: Oct. 25, 1988

[54] FAILURE JUDGMENT SYSTEM FOR SENSORS INSTALLED IN ENGINE

[75] Inventors: Jiro Nakano, Okazaki; Takashi Ogawa, Toyota, both of Japan

[73] Assignee: Toyota Jidosha Kabushiki Kaisha, Toyota, Japan

[21] Appl. No.: 827,170

[22] Filed: Feb. 7, 1986

[30] Foreign Application Priority Data

Jul. 23, 1985 [JP] Japan ................. 60-163226

[51] Int. Cl.$^4$ ................................ F02B 3/00
[52] U.S. Cl. ................. 364/431.03; 364/431.11; 123/479; 73/117.3
[58] Field of Search ........... 364/431.01, 431.10, 364/431.04, 431.05, 431.11; 73/117.3, 118.1; 371/20; 123/479, 478, 480

[56] References Cited

U.S. PATENT DOCUMENTS

| | | | |
|---|---|---|---|
| 4,325,251 | 4/1982 | Kanegae | 73/117.3 |
| 4,531,495 | 7/1985 | Yamato et al. | 123/479 |
| 4,537,065 | 8/1985 | Ootsuka et al. | 73/117.3 |
| 4,572,143 | 2/1986 | Umesaki et al. | 123/479 |
| 4,615,321 | 10/1986 | Haefner et al. | 123/479 |

FOREIGN PATENT DOCUMENTS

| | | | |
|---|---|---|---|
| 3213155 | 10/1983 | Fed. Rep. of Germany | 364/431.01 |
| 0222939 | 12/1983 | Japan | 123/479 |
| 0108831 | 6/1984 | Japan | 123/479 |

Primary Examiner—Parshotam S. Lall
Attorney, Agent, or Firm—Cushman, Darby & Cushman

[57] ABSTRACT

A sensor failure judgment system includes a plurality of condition sensors and a monitored sensor. A first failure judgment device monitors the condition sensors to determine proper operation thereof. If any condition sensor is not properly operating, its output signal is replaced by a standard value. A second faliure judgment device monitor determines the condition of the monitored sensor based on the output signals of the condition sensors. The monitored sensor is determined as having failed if the output signals of the condition sensors as compared with the output signal of the monitor sensor so indicate. A fail safe device is also provided, which receives the output signals of the condition sensors and determines if any of these output signals are the standard signal. If any of these output signals are the standard signal, the failure judgment is inhibited so that the monitored sensor will not be incorrectly judged as having failed.

14 Claims, 9 Drawing Sheets

4,780,826

FAILURE JUDGMENT SYSTEM FOR SENSORS INSTALLED IN ENGINE

BACKGROUND OF THE INVENTION

1. Technical Field

This invention relates to a failure judgment system for sensors which detect various data concerning engines.

2. Prior Art

Internal combustion engine for automobiles are often controlled by a microcomputer. Various data concerned with the engine are usually detected and/or controlled by a number of sensors associated with the microcomputer. A failure judgment system for these sensors, which detect various data for accurate control, performs an important role for controlling engines. A plurality of means have been adopted for the of failure thereof judgment. A fail-safe function has been used, which is a function to stop the engine or to perform a change-over control to an alternative standard value for emergency evacuation. This has been triggered by emergencies such as a bad condition of the engine and abnormal overheating of the catalyst which can occur when the control is continued in the same way, using signals outputted abnormally by a failed sensor. The above-mentioned system includes a means to judge the failure of one sensor by combining signals from the other sensors. For example, one system utilizes a failure judgment system to detect failures of the speed sensor in accordance with the output signals of the inlet pipe pressure sensor, the engine speed sensor, and the cooling water temperature sensor, etc. However, failure judgment is done by masking the signals from the monitored sensor and substituting the standard value for emergency evacuation instead of the signals from the monitored sensor. The above-mentioned failure judgment system to detect failures of one sensor by combining the other sensors, however, has a defect in that the judgment can not be reliably executed when a sensor fails, even if only one of the sensors is judged to have failed.

The system that uses the above-mentioned sensors judge failures by using the failure judgment condition combined therefore sometimes misjudge the sensor to be abnormal even if the above-mentioned condition is not actually met, since the combined judgment conditions include the standard value.

SUMMARY OF THE INVENTION

One object of this invention is to provide a failure judgment system which enables correct judgment of sensors.

Another object of this invention is to provide a failure judgment system which enables to make the system free from the dangerous condition.

A further object of this invention is to provide failure judgment system which can prevent misjudging the sensor to be abnormal when the sensor is actually normal.

To achieve these objects, this invention includes a failure judgment system for sensors installed in an engine. This system includes a plurality of condition sensors which are installed in the engine and detect operational conditions of the engine. These condition sensors provide several output signals that indicate the operational conditions of the engine. A monitored sensor is the object of monitoring of this invention, and is installed in the engine to monitor another operational condition of the engine. This monitored sensor also provides output signals which indicate another operational condition of the engine. A first failure judgment device is provided which monitors the condition sensors to determine proper operation thereof. When an improper operation is determined, a standard value replaces the output signal of the respective sensors which have failed. A second failure judgment means monitors the monitored sensor and the condition sensors. This second failure judgment structure determines if the monitored sensors are operating correctly based on the condition sensors. A fail-safe device receives the output signals of the condition sensors and determines if any of these output signals are the standard signals. The second failure judgment device is inhibited if any of these output signals are determined to be the standard signals. In this way, the monitored sensor which is normally monitored to determine failure based on the outputs of the condition sensors is operated in a fail-safe mode. Specifically, this monitored sensor can be determine as being failed only when all of the condition sensors are operating properly.

BRIEF DESCRIPTION OF DRAWINGS

These and other objects of this invention may be best understood in reference to the following description of a preferred embodiment and the drawings in which.

DETAILED DESCRIPTION OF PREFERRED EMBODIMENT

Figure 1:
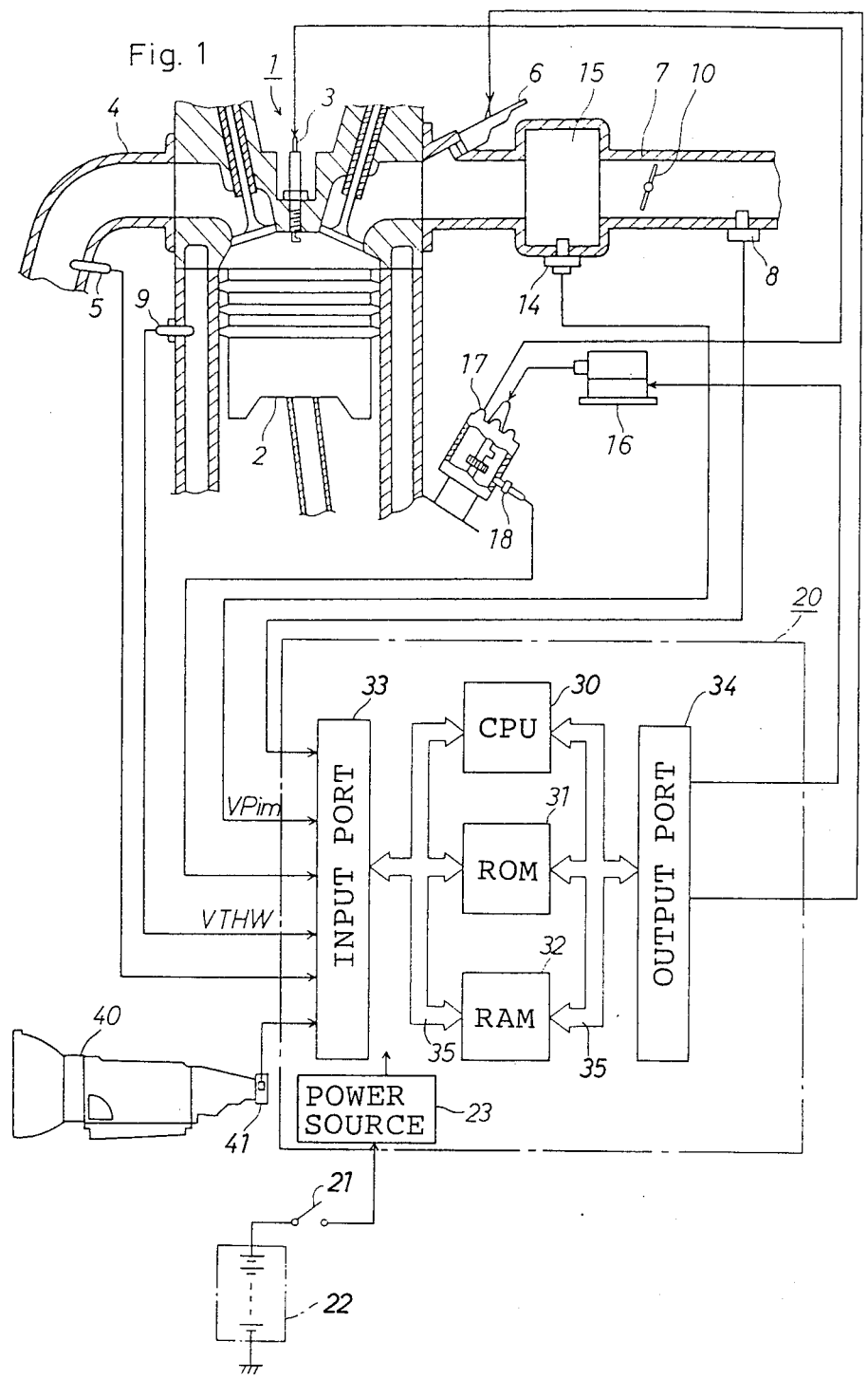
FIG. 1 illustrates an internal combustion engine incorporating a failure judgment system of the first embodiment utilizing this invention.

Referring to FIG. 1, the internal combustion engine system is equipped with an electronic fuel injector where the failure judgment means for sensors of this invention is available. The engine system includes one cylinder of the 4-cylinder internal combustion engine and its electronic control unit. Numeral 1 denotes the body of the internal combustion engine. Numeral 2 denotes a piston. Numeral 3 shows a spark plug. Numeral 4 shows an exhaust manifold. Numeral 5 denotes an oxygen sensor which is installed in the exhaust manifold 4, and detects the residual oxygen concentration among the exhaust gas in analog quantity. Numeral 6 designates a fuel injection valve which injects fuels into the intake air in the internal combustion engine 1. Numeral 7 denotes an intake manifold. Numeral 8 shows an intake-air temperature sensor which reads the temperature of the intake air to be sent into the internal combustion engine 1. Numeral 9 denotes a water temperature sensor which detects the temperature of the internal combustion engine cooling water by means of the analog output change of the electric resistance. Numeral 10 shows a throttle valve. Numeral 14 shows a pressure sensor to detect the intake pressure of the surge tank 15 which absorbs the pulsation of the intake air. The intake pressure is detected by the electric signal in analog quantity.

Numeral 16 denotes an igniter which generates the high-power voltage required to the spark plug 3. Numeral 17 denotes a distributor interlocking with a crankshaft which is not illustrated here. Numeral 18 denotes a crank angle sensor installed in the distributor 17. The sensor provides four pulse signals per one revolution of the distributor 17 or twice of the crankshaft. Numeral 20 shows the elctronic control unit as the electronic controlled part. Numeral 21 denotes a key switch. Numeral 22 denotes a battery which supplies electric power to the power source 23 within the electronic controlled unit 20 via the key switch 21.

Electronic controlled unit 20 operates as follows. Numeral 30 designates the Central Processing Unit (CPU) to enter and calculate the data outputted from each sensor according to the control program and execute the required processes for operation and control of each unit. Numeral 31 designates a Read Only Memory (ROM) which stores the control programs and the initial data. Numeral 32 denotes a Random Access Memory (RAM) where the data to be entered into the electronic control unit 20 and the data required to the operational control are temporarily read and written out. Numeral 33 denotes the input port to enter signals sent from each sensor. Numeral 34 designates the output port which drives the igniter 16 and the fuel injection valve 6 installed in each cylinder. Numeral 35 denotes the common bus which joins each element with one another. The input port 33 includes the analog input part and the pulse input part (not illustrated). In the analog input part, the analog signals from the oxygen sensor 5, the intake-air temperature sensor 8 and the water temperature sensor 9, the pressure sensor 14 are received and converted into binary numbers representative of the respective analog signal. In the pulse input part, pulse signals sent from the revolution speed sensor 41 is entered into the unit. The sensor 41 detects the crank angle and the vehicle speed SPD by utilizing the lead switch to detect the revolution speed of a magnet which is rotating with the shaft of the transmission gear 40. The above-mentioned voltage VTHW at both ends of the water temperature sensor 9 and the voltage VPim at both ends of the pressure sensor 14 are the value of voltage drop against the electric current applied from the input port 33.

Figure 2:
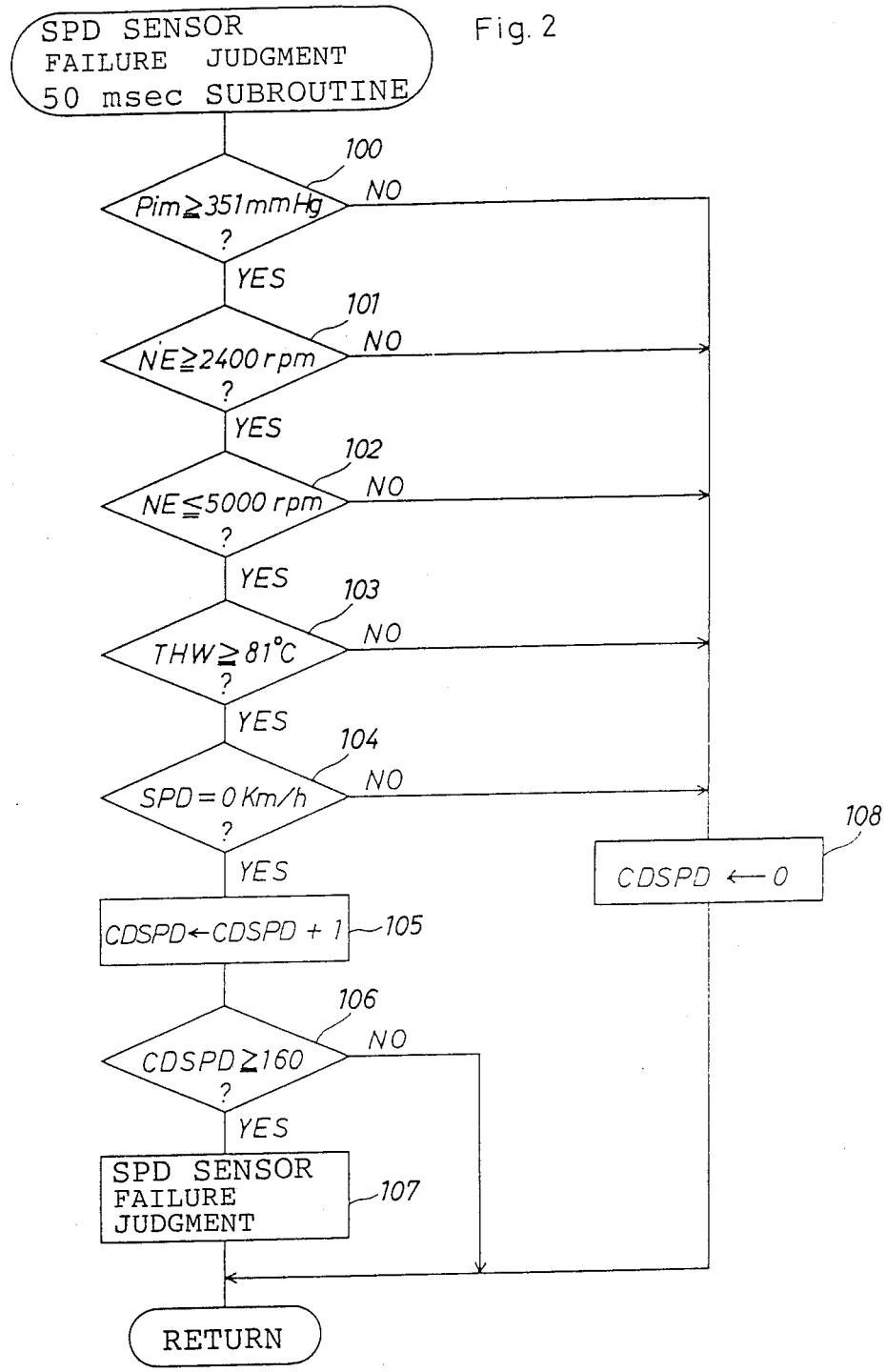
FIG. 2 illustrates a flowchart of the SPD sensor failure judgment 50 msec subroutine in the first embodiment.
Figure 3:
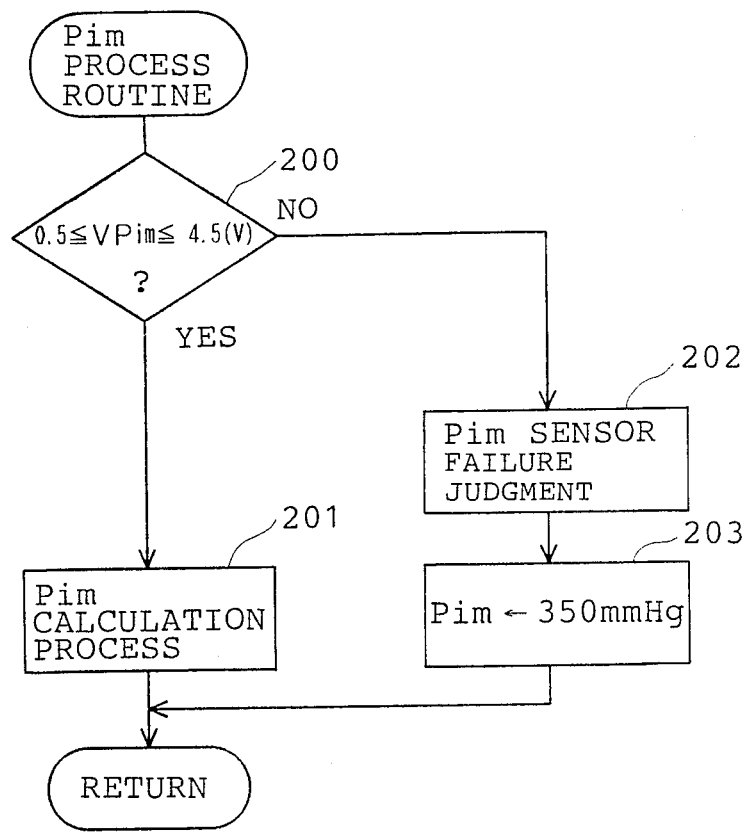
FIG. 3 is a flowchart illustrative of the Pim process subroutine in the first embodiment.
Figure 4:
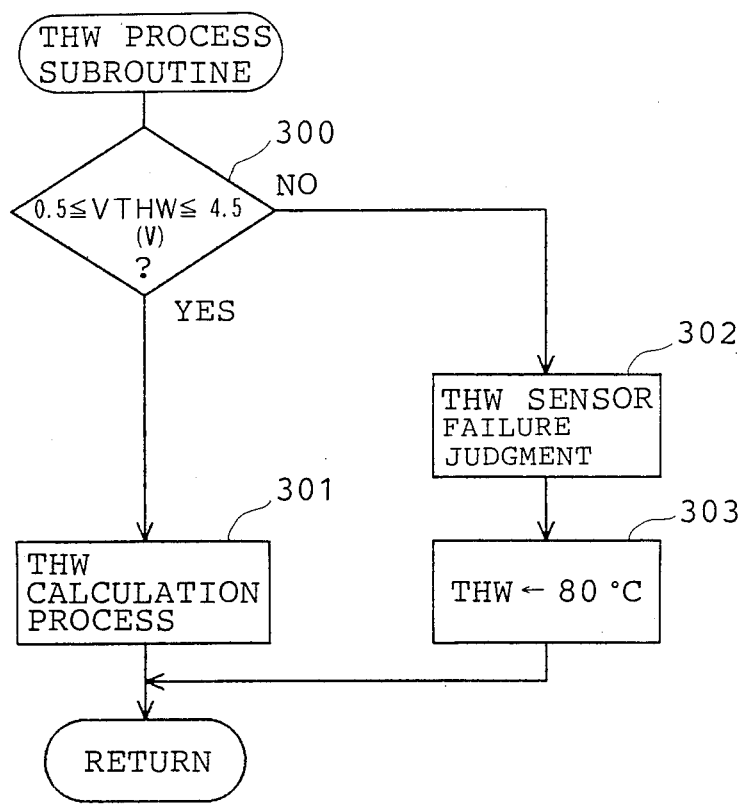
FIG. 4 is a flowchart illustrative of the THW process subroutine in the first embodiment.

The control system used by the electronic control unit 20 in this embodiment is described by utilizing flowcharts shown in FIG. 2 thru FIG. 4. FIG. 2 is a flowchart illustrative of a SPD sensor failure judgment 50 msec subroutine. This routine makes a determination of whether SPD sensor 41 has failed, every 50 ms. The SPD sensor detects the vehicle speed by utilizing the characteristic part of this embodiment.

At the beginning of this flowchart, the judgment is carried out in decision point 100 to decide whether or not the intake pressure Pim given by the intake pressure Pim process routine (cf. FIG. 3) is greater than or equal to 351 mmHg. If the result of this judgment is corresponding to the range, the control proceeds to step 101. If not, control proceeds to step 108.

The object of decision point 102 is to judge whether or not the engine speed (NE) is less than or equal to 5,000 rpm. If the result corresponds to the range, control proceeds to decision point 103. If not, control proceeds to step 108.

The object of decision point 103 is to judge whether or not the cooling water temperature THW decided by the internal combustion engine cooling water THW process routine (cf. FIG. 3) is greater than or equal to 81° C. If the result of this judgment corresponds to the above-mentioned range, control proceeds to decision point 104. If not, control proceed to step 108.

The object of decision point 104 is to judge whether or not the vehicle speed SPD is 0 km/h. If the SPD is 0 km/h, control proceeds to step 105. If not, control proceeds to step 108.

Therefore, the decisions made at steps 100 thru 103 judges whether or not the condition is proper for the judgment of the vehicle speed in the point 104. These steps monitor condition sensors 9 and 14.

That is, the judgment of whether the SPD is 0 km/h can not be done until all conditions are satisfied as follows; intake pressure Pim is greater than or equal to 351 mmHg, engine speed NE is within the range of 2,400 rpm thru 5,000 rpm, and cooling water temperature THW is greater than or equal to 81° C.

When all conditions of the above-mentioned points 100 thru 104 are satisfied, the failure judgment of the SPD sensor 41 is performed in step 105, point 106 and step 107. specifically, in step 105 the speed counter CDSPD is incremented. In decision point 106, after the increment is completed, the value of CDSPD is judged to determine whether or not it is greater than or equal to 160. If the result of this judgment corresponds to the above-mentioned range, control proceeds to step 107 wherein the vehicle speed (SPD) sensor is judged as having failed. If not, the process step exits, without judging a failure of SPD sensor.

The aforementioned points 105 thru 107 are performed only if judgment conditions of points 100 thru 104 are all satisfied. SPD sensor failure judgment 50 msec subroutine must enter into step 105 over 160 times before the SPD sensor is judged to have failed. If this value is less than 160 times, the SPD sensor is judged to be normal.

The value of the vehicle speed counter CDSPD is cleared to inhibit the failure judgment of SPD sensor 41 when the judgment result of any one of points 100 thru 104 are not satisfied. After the step 108 is executed, the increment processes of CDSPD in step 105 are started from the condition that the value of CDSPD is zero.

FIG. 3 illustrates the Pim process subroutine to achieve the intake pressure Pim used in the point 100 of FIG. 2.

The Pim process subroutine is initiated at decision point 200, where the voltage VPim of the pressure sensor 14 is checked to determine whether or not it is within the range from 0.5 V to 4.5 V. If the result corresponds to the above-mentioned range, the intake pressure Pim is calculated by the value of VPim in step 201 and the process step exits. If not corresponding to the above-mentioned range, the Pim sensor is regarded as being in a failure mode in step 202. Then in step 203, the value of Pim is replaced with the standard value 350 mmHg and once the process exits.

Namely, if the value of VPim in decision point 200 is within the range from 0.5 V to 4.5 V, the value of Pim is calculated. If not, the Pim sensor is judged as failure, and the value of Pim is replaced by the standard value.

FIG. 4 illustrates the THW process subroutine to get the temperature of cooling water used in point 103 of FIG. 2.

When the THW process subroutine is initiated, the voltage of water temperature sensor 9 (VTHW) is judged to determine whether or not it is within the range from 0.5 V to 4.5 V in decision point 300. If the result corresponds to the above-mentioned range, the calculation to get the temperature of cooling water (THW) by means of the value of VTHW is carried out in step 301, and once the process exits. If the value of VTHW does not correspond to the above-mentioned range, the THW sensor is judged as being failed in step 302, and the standard value 80° C. is substituted for Thw in step 303, and the process exits.

In this THw process routine, therefore, the THW is calculated when the value of VTHW is within the range from 0.5 V to 4.5 V in point 300. If not, the THW sensor is judged as failure and the THW is replaced by the standard value.

This embodiment produces the advantage that the SPD sensor will not be erroneously misjudged as having failed attributable to the fact that the intake pressure Pim sensor or the cooling water temperature THW sensor has failed.

The judgement performed in steps 100–103 use a threshold value which is 1 LSB (least significant bit) higher than the standard value which is set up when the pressure (Pim) sensor 14 or the water temperature (THW) sensor 9 fails. Because of this, the number of words required for the program can be reduced, in comparison with the case where the judgment whether or not the Pim sensor or the THW sensor has failed is executed. Also, the capacity of storage elements, e.g, RAM 32 can be reduced.

Figure 5:
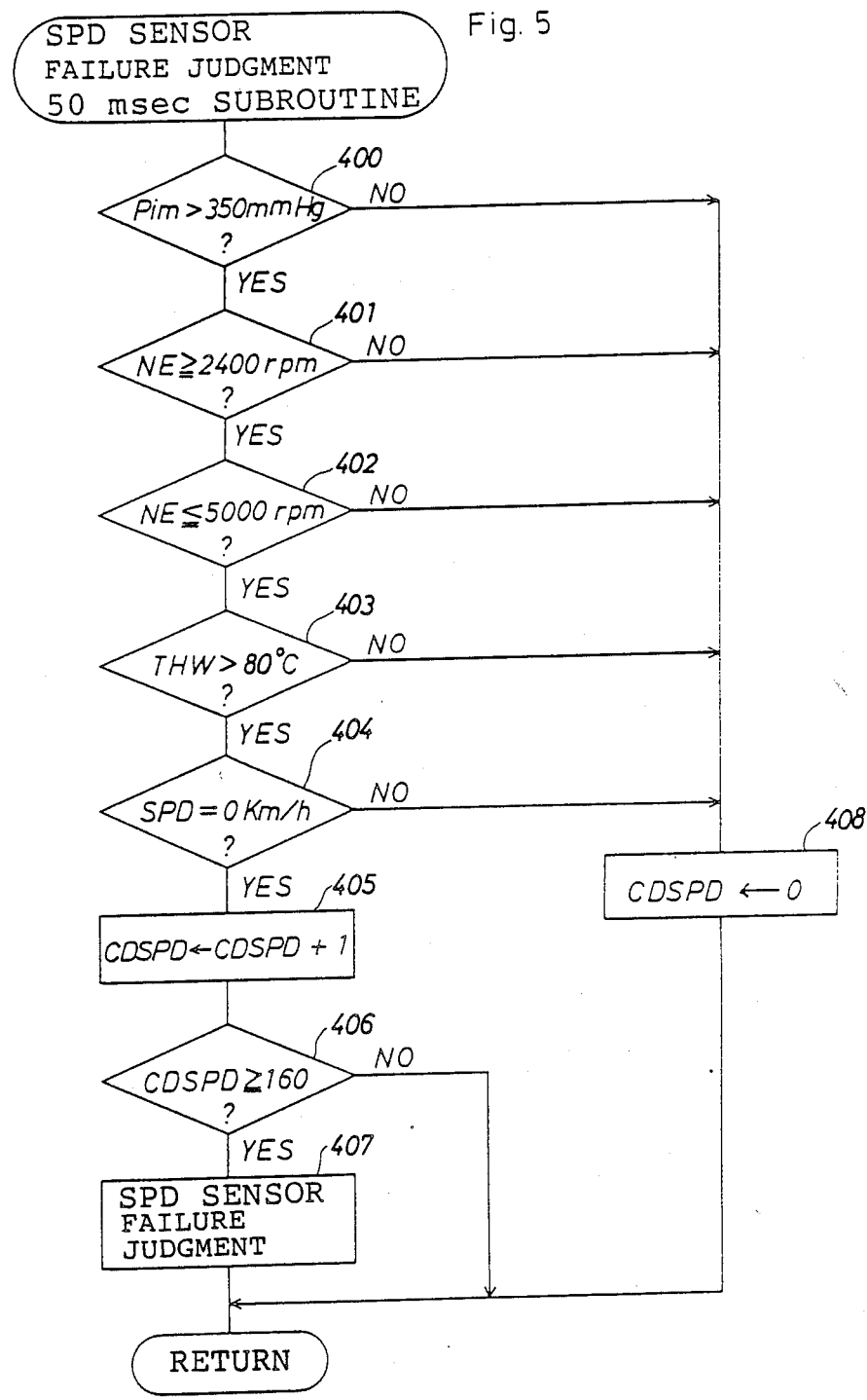
FIG. 5 is a flowchart illustrative of the SPD sensor failure judgment 50 msec subroutine in the second embodiment.

FIG. 5 illustrates and describes the second embodiment. While the second embodiment is similar to the first embodiment in FIG. 2, there are some differences in the judgment system of the intake pressure Pim and the cooling water temperature THW in Point 100 and 103. The differences are found in only points 400 and 403 as follows:

Pim> =351 mmHg (point 100) - - - Pim 350 mmHg (point 400)

THW> =81° C. (point 103) - - - THW 80° C. (point 403)

Therefore, the explanations of other points 401, 402, 404 and step 408 are omitted because they are same as in the first embodiment.

The function and the effect of the above-mentioned second embodiment are similar to the first embodiment. It is possible to prevent the misjudgment of failure judgment of SPD sensor that is caused by SPD the failure of the intake pressure Pim sensor or the cooling water temperature THW sensor. The failure of those sensors are the precondition to detect the failure of the vehicle speed (SPD) sensor 41.

In comparison with the judgment utilizing the process of [standard value+1LSB] in step 100 and 103 of the first embodiment, the flowchart of the second embodiment determines "over standard value" (the determination is "greater than" as opposed to "greater than or equal to") without standard value, so that the process of [standard value+1LSB] can be omitted.

Figure 6A:
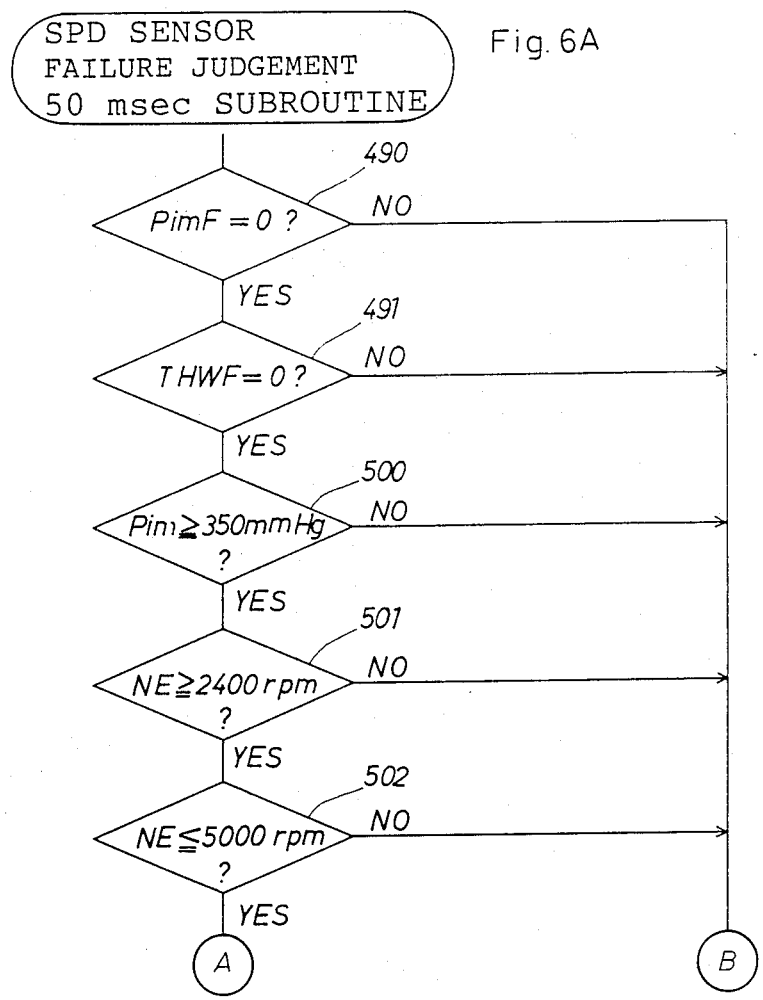
FIGS. 6A and 6B are flowcharts illustrative of the SPD sensor failure judgment 50 msec subroutine in the third embodiment.
Figure 7:
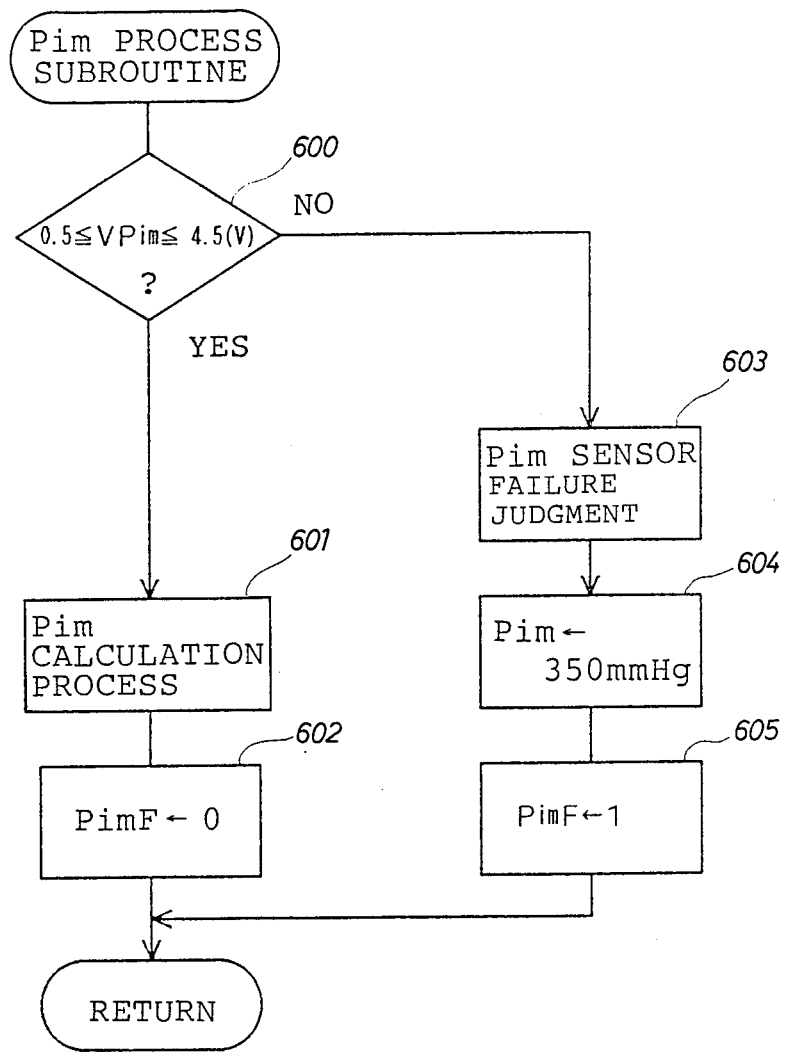
FIG. 7 is a flowchart illustrative of the Pim process subroutine in the third embodiment.
Figure 8:
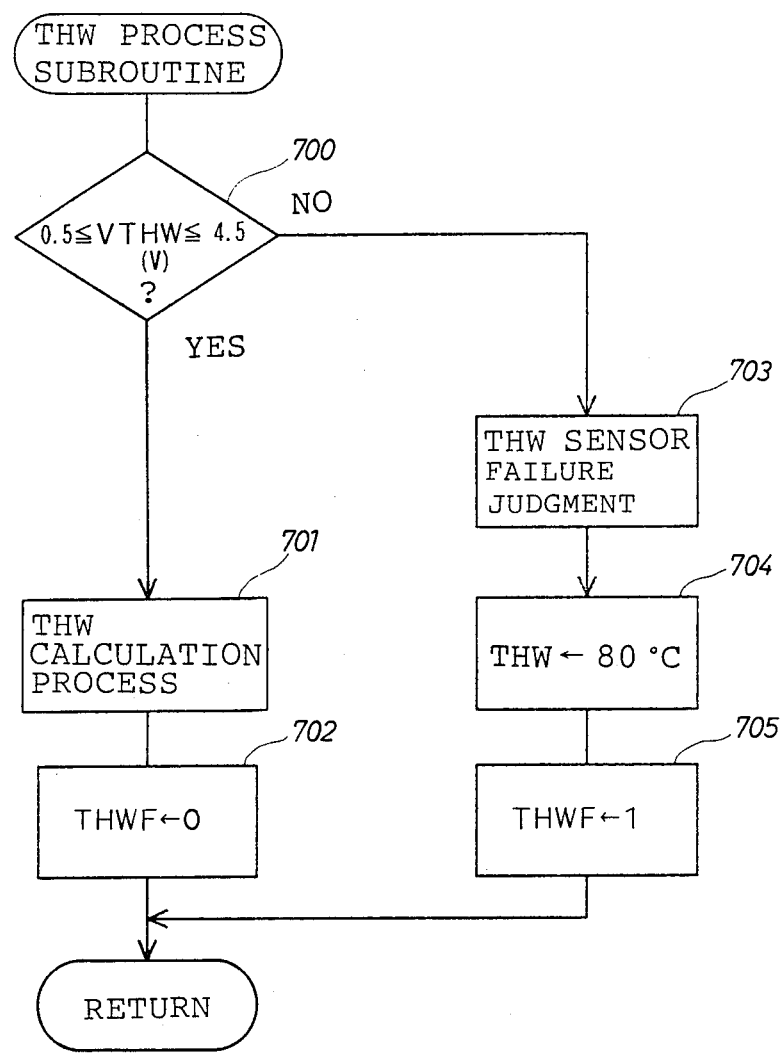
FIG. 8 is a flowchart illustrative of the THW process subroutine in the third embodiment.

FIG. 6A, FIG. 7, and FIG. 8 illustrate and describe the third embodiment.

While the third embodiment is fundamentally the same as the first and the second embodiments, the following function is different. When the pressure (Pim) sensor 14 or the water temperature (THW) sensor 9 indicates a failure, the failure flag PimF or THWF is set, and the failure judgment of the SPD sensor is interrupted.

Figure 6B:
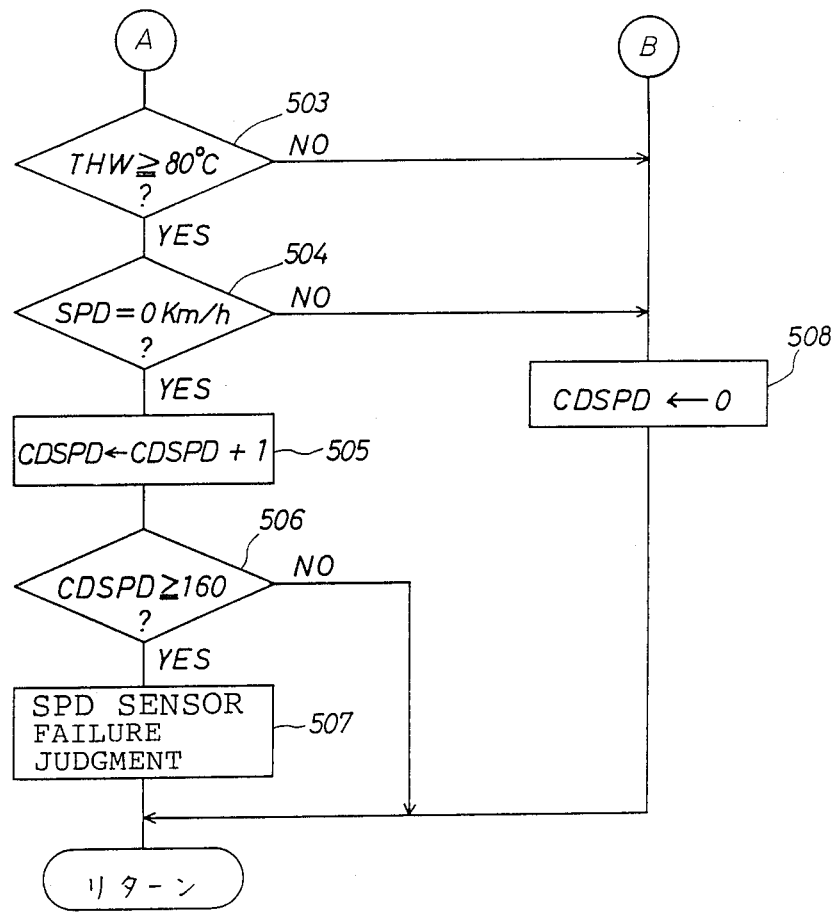

Explanations of the flowchart of the third embodiment are given hereinunder. When the SPD sensor failure judgment 50 msec subroutine in FIGS. 6A and 6B is started, the pressure sensor failure flag PiMF or the water temperature sensor failure flag THWF is judged to determined whether or not its value is zero in points 490 and 491 respectively by utilizing flags in the flowchart of the aftermentioned FIG. 7 and FIG. 8. If both of the judged values of PimF and THWF are zero, the subroutine proceed to decision point 500. If not, the control proceeds to step 508. After the flag judgment in points 490 and 491, the following conditions, i.e., the intake pressure Pim is greater than or equal to 350 mmHg, engine speed NE is within the range from 2,400 rpm to 5,000 rpm, cooling water temperature THW is greater than or equal to 80° C., vehicle speed SPD=0 km/h, are determined in decision point 500 thru 504. If any one of the conditions is not satisfied, the subroutine proceed to step 508. If all of the above-mentioned conditions are satisfied, proceed to step 505. In step 505, decision point 506 and 507 entered from the above-mentioned steps, the failure judgment of SPD sensor is performed. Specially, it is judged whether or not all results of the judgment in point 490, 491, and 500 thru 504 are satisfied and continuously proceed 160 times to step 505. If the above-mentioned condition is satisfied, the SPD sensor is judged as failure.

If the conditions in points 490, 491, and 500 thru 504 are not satisfied, inhibit the failure judgment of SPD sensor, the speed counter CDSPD is cleared in step 508.

Detailed explanations of steps 505 thru 508 are omitted because they are just same as in the first and second embodiments.

FIG. 7 is a flowchart illustrative of the PimF process subroutine, where the intake pressure Pim which is used in the flowchart of FIGS. 6A and 6B is detected and the pressure sensor failure flag PimF is also set or reset. The following explains the Pim process subroutine.

The object of the process is to judge whether or not the voltage (VPim) of pressure sensor 14 is within the range from 0.5 V to 4.5 V in decision point 600 to judge whether the sensor 14 is in failure mode or not. If the result is corresponding to the above-mentioned range, process to step 601 and 602, where the Pim calculation process and the reset of pressure sensor failure flag PimF are carried out.

If the result of the judgment in point 600 does not correspond to the above-mentioned range, control proceeds to step 603 thru 605. After that the Pim sensor is judged as having a failure, and the standard value 350 mmHg is substituted for Pim and the PimF is set.

Where any one of the above-mentioned points 600 step 601 thru 605, is over, the process exits.

FIG. 8 is a flowchart illustrative of the THW process subroutine, where the cooling water temperature THW to be utilized in the flowchart of FIG. 6 is detected and the water temperature sensor failure flag THW is also set or reset.

The following explains the THW process subroutine. The object of this process is to judge whether or not the voltage VTHW of water temperature sensor 9 is within the range from 0.5 V to 4.5 V in point 700 to judge whether the sensor 14 has failed or not. If the result is corresponding to the above-mentioned range, proceed to steps 701 and 702, where the Pim calculation process and the reset of water temperature sensor failure flag THWF are carried out. If the result of the judgment in point 700 is not corresponding to the above-mentioned range, the sensor 9 is judged as failure, and the subroutine proceed to steps 703 thru 705, and the THW is replaced with the standard value 80° C., and the flag THWF is set.

When any one of the above-mentioned points 700 step 701 thru 705 is over, the process exits.

The function and the effect of the above-mentioned third embodiment are similar to the first or the second embodiment. It is possible to prevent a misjudgment in the failure judgment of SPD sensor, just like the first or the second embodiment, that is caused by the failure of the intake pressure Pim sensor or the cooling water temperature THW sensor.

As the pressure sensor failure flag PimF and the water temperature sensor failure flag THWF are utilized, it is possible to provide the failure flags PimF and THWF to other controls, judgment, and indications.

The $O_2$ sensor also enables to prevent the misjudgment in failure judgment in the same manner for the SPD sensor, by utilizing the combined signals sent from other sensors.

The foregoing description of a preferred embodiment for the purpose of illustrating the invention is not to be considered as limiting or restricting the invention, since many modifications may be made by one skilled in the art without departing from the scope of the invention.

The embodiments of the invention in which an exclusive property or privilege is claimed are defined as follows:

1. A sensor failure judgment apparatus for an engine, comprising:
   a plurality of condition sensors, installed in said engine for detecting operational conditions of said engine and providing several output signals indicating said operational conditions of the engine;
   a monitored sensor installed in the engine for monitoring another operational condition of said engine and providing another output signal indicating said another operational condition of the engine;
   first failure judgment means for monitoring said condition sensors to determine proper operation and for generating a failure signal if an improper operation of any of said condition sensors is determined, and for replacing said output signal of a sensor which has been determined to have said improper operation by a standard signal, responsive to said failure signal;
   second failure judgment means, monitoring said monitored sensor and said condition sensors, for determining if said monitored sensor is operating correctly based on outputs of said condition sensors; and
   fail safe means, receiving said several output signals of said condition sensors, for determining if any of said several output signals are said standard signals, and inhibiting said second failure judgment means in response to a determination of said standard signals to prevent a misjudgment of failure of said monitored sensor.

2. An apparatus as in claim 1, wherein said condition sensors sense pressure, engine speed and automobile water temperature, and wherein said determining means determines whether said pressure is greater than said standard signal plus a predetermined value, whether said engine speed is greater than or a first value and less than a second value, and whether said water temperature is greater than a standard value and wherein said predetermined value is zero.

3. An apparatus as in claim 1, wherein said condition sensors include a water temperature sensor providing a signal indicative of a water temperature and an intake pressure sensor providing a signal indicative of an intake pressure.

4. An apparatus as in claim 3 wherein said monitored sensor is a speed sensor which provides a signal indicating an axial revolution speed of a transmission.

5. An apparatus as in claim 1, wherein said monitored sensor is a speed sensor which provides a signal indicating an axial revolution speed of a transmission.

6. An apparatus as in claim 5, wherein said second failure judgment means further comprises: (a) means for judging said another output signal of said speed sensor to determine whether said another output signal is equal to a predetermined value, (b) means for determining a length of time that said another output signal remains at said predetermined value, and (c) means for determining a failed sensor if said output value remains at said predetermined value.

7. An apparatus as in claim 1, wherein said monitored sensor is an $O_2$ sensor.

8. An apparatus as in claim 1, wherein said first failure judgment means includes means for comparing output signals of said condition sensors with predetermined limits and determining a failure if said output signals of said condition sensors are outside said predetermined limits.

9. An apparatus as in claim 1, wherein said condition sensors sense pressure, engine speed and automobile water temperature, and wherein said determining means determines whether said pressure is greater than said standard signal plus a predetermined value, whether said engine speed is greater than or equal to a first value and less than or equal to a second value, and whether said water temperature is greater than or equal to a standard value.

10. An apparatus as in claim 1, wherein said fail safe means includes means for determining whether the output signals of said condition sensors are outside of a range, a limit of which is defined by said standard signal plus a predetermined value.

11. An apparatus as in claim 10, wherein said determining means includes means for determining whether one output signal of the first condition sensor is greater than or equal to a value equivalent to said standard signal plus one.

12. An apparatus as in claim 10, wherein said determining means includes means for determining whether an output signal of one of said condition sensors is greater than a value equivalent to said standard signal, and wherein said predetermined value is zero.

13. A system for determining a failure of a sensor within an automobile that includes an engine, comprising:

plurality of condition sensors, installed in said engine, for determining operational conditions of said engine and providing output signals indicative thereof;

a monitored sensor, installed in said engine, for monitoring another operation condition of said engine and providing an output signal indicative thereof; and processing means for:
(1) monitoring said condition sensors to determine a proper operation thereof and producing an indication of a failed condition sensor;
(2) substituting a standard value in place of an output signal from said failed condition sensor;
(3) determining if said monitored sensor is operating correctly, by using output signals of said condition sensors;
(4) determining if any of said output signals of said condition sensors are said standard signals; and
(5) inhibiting said determination of proper operation of said monitored sensor if any of said output signals condition sensors are said standard signals.

14. An apparatus as in claim 13, wherein said processing means further comprises means for comparing each of said outputs of said condition sensors with predetermined limits, wherein said predetermined limits are equivalent to a value greater than said standard signal.

* * * * *